F. H. RICHARDS.
COLLAPSIBLE TAP.
APPLICATION FILED MAY 13, 1916.
1,290,356.
Patented Jan. 7, 1919.
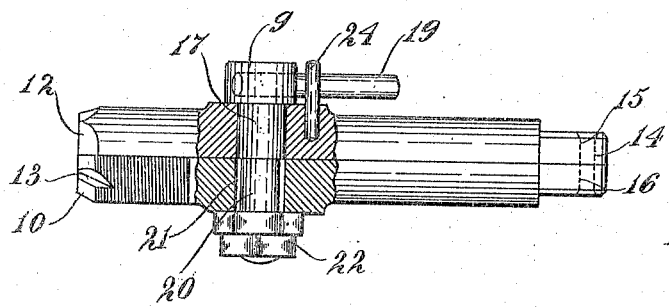
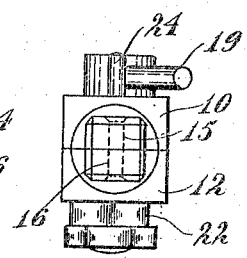
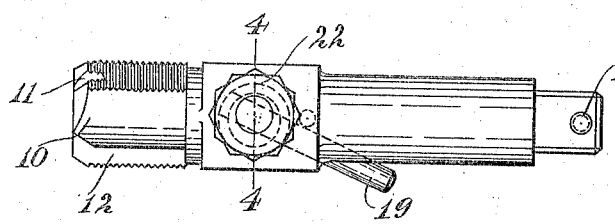
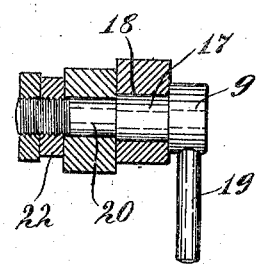
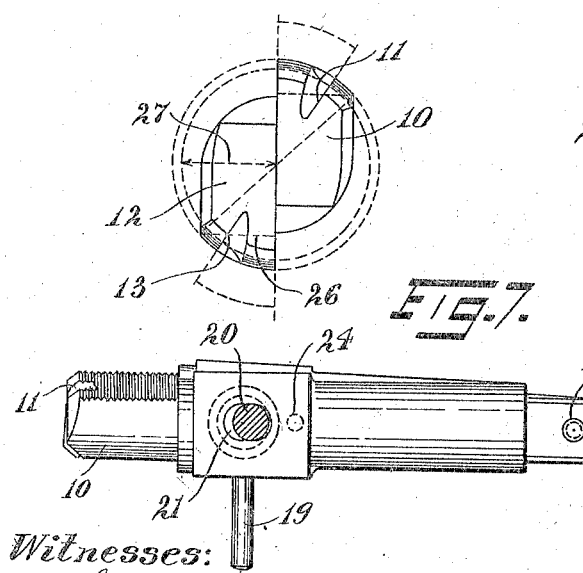
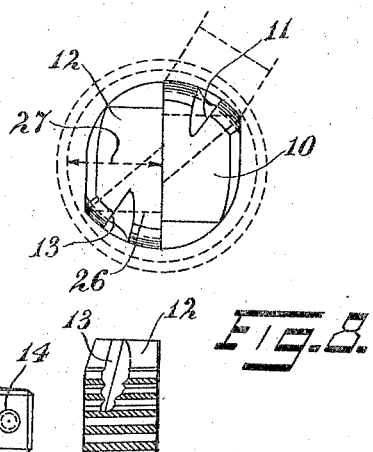
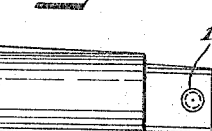
Witnesses:
L. O. Badeau.
H. D. Penney.
Inventor:
Francis H. Richards.

UNITED STATES PATENT OFFICE.

FRANCIS H. RICHARDS, OF HARTFORD, CONNECTICUT.

COLLAPSIBLE TAP.

1,290,356.      Specification of Letters Patent.      Patented Jan. 7, 1919.

Application filed May 13, 1916. Serial No. 97,213.

*To all whom it may concern:*

Be it known that I, FRANCIS H. RICHARDS, a citizen of the United States, residing in Hartford, in the county of Hartford and State of Connecticut, have invented certain new and useful Improvements in Collapsible Taps, of which the following is a specification.

This invention has for one object to provide an improved form of collapsible tap, that is embodied in two complemental tapping members shiftable to open and close, which members or sections themselves carry the operating means to cause the opening and closing movement. Another object is to provide a supplemental short cutting face extending inward for a short distance from the extremity of the chaser to prevent interference with its operation by the accumulation of chips.

In the accompanying drawing showing one embodiment of my invention Figure 1 is a side elevation, partly in section. Fig. 2 is an end elevation. Fig. 3 is a plan. Fig. 4 is a section on the line 4—4 of Fig. 3. Fig. 5 is an end view enlarged showing the chaser portions only in the open or operative position, and Fig. 6 is a similar view with the chasers closed. Fig. 7 is an elevation similar to Fig. 3 with the chasers closed and the retaining nuts omitted. Fig. 8 shows enlarged the end portion of one chaser illustrating the short extra cutting face.

The tapping device is shown comprising a bar that is divided on a longitudinal plane, preferably passing through its axis, into two sections and which sections are slidable transversely on the contacting faces in this plane. At one end the sections have threaded portions constituting chaser parts, and when the sections are shifted to cause a slight separation, the threads will be in the proper position to cut a thread in a bore. It will be seen from Fig. 5 that the cutting faces of the sections form what is termed the land. In addition to this cutting face, each chaser portion is preferably provided with a short cutting portion. The section 10 is provided with a cutting portion 11 extending a short distance only back from the extremity of the chaser, and the section 12 is provided with a short cutting portion or face 13 also extending a short distance only back from the end. Both of these cutting portions are tapered rearwardly, and will have the effect of feeding forward all chips or cuttings, and will prevent the latter from clogging up the thread being cut in the work. The sections 10 and 11 are connected at a portion beyond the chaser ends with connecting means preferably in the form of a hinge on which they can swing, which hinge is preferably formed by a pin located in bores transverse to the said contacting faces. At another portion beyond the cutting ends means are provided that are carried solely by the two sections and which serve to swing the sections on said pivot pin, whereby their chaser parts will open and close. The sections are shown as pivoted at their rear extremities by a pin 14 passing through bores 15 and 16 in the sections, whereby they will slide on their contacting faces.

At an intermediate portion the operating means of the chasers is mounted. In the form illustrated a spindle 17 passes through a transverse bore 18 in the chaser section 10, having preferably a head 9, and an operating handle 19 whereby it is swung. The spindle has an extension 20 that is preferably cylindrical, but is arranged eccentric to the cylindrical portion 17 swinging in its bore of the section. This eccentric portion 20 passes through a slot 21 in the other tap section 11, the width of the slide being equal to the diameter of the extension, and its longitudinal axis extending lengthwise of the section. Preferably the extension 20 has a threaded end portion on which one or more nuts 22 are screwed, that will secure the spindle in position, and will also serve to entirely close the slot 21 and effectually prevent the entrance of chips or dirt of any kind into the slot in which the eccentric 20 operates. It will be further seen that the head 9 of the spindle closes the aperture in the other section and hence keeps out all dust and dirt. Upon swinging the spindle by the handle it will rotate in one section, and its eccentric portion will engage the walls of the slot and cause the sections to swing relatively on the pivot 14, in the plane of their contacting faces. When the portion 20 is in its position of greatest eccentricity the sections will be separated the maximum amount, and it will be on a dead center, whereby the sections are locked against closing by any reactionary pressure, but can only be closed by swinging the spindle. The turning of the spindle from this dead center position in either direction will serve to swing the section in the opposite direction and cause the tap portions to close from the position of Fig. 5 to that shown in Fig. 6. If desired a stop pin 24 may be placed in the section 10 to limit the opening movement of the handle, and indicate that the eccentric is on its dead center, to hold the chaser portions in open position for the cutting operation.

It will be seen that as the sections slide on their contacting faces and a comparatively small amount a closing movement will not cause the formation of any open space into which chips and dirt could pass to clog up the device and prevent its proper operation, or to cause undue wear on the structure.

Comparing Fig. 5 with Fig. 6 it will be seen that a comparatively small movement is required to cause the chasers to so close and reduce their maximum diameter, that in this position they will be located inside of and clear from the thread cut in the article. From it follows that the tap can be withdrawn without causing it to be rotated in a reverse direction. In fact if the tap is rotated by a machine, its rotation does not need to be even stopped, but the cutting portions being entirely withdrawn from the thread in the article, the tap can be drawn out from the hole still rotating in the same direction. It will be further seen from Figs. 5 and 6 that the sine of the angle of the outer circle of thread is less than the radius of the inner circle, that is, of the inner radius of the bore of the thread cut in the article. The line 26 in Fig. 5 is the sine of the angle of the entire cutting faces of the tap section. This line is less than the line 27 that is the radius of the threaded bore in the article cut. By comparing Fig. 5 with Fig 6, it will be seen that this will give ample clearance for the withdrawal of the tool from the threaded hole, even if the tool is still rotating in the direction to cut the thread.

It will be further observed that the tap is composed of two members that are complemental, that is, are practically identical; and that each member is provided with a substantially double cutter, the main cutting face or land extending throughout the length of the threaded portion, while the other or supplemental cutting portion, located rearward in the direction of rotation extends only a small portion of the length of the main cutting portion. By reason of having only two shiftable cutting members, each of them can be made to have its supporting portion, that is, the part extending from the rear of the thread around rearwardly to the cutting face or land of the other member, formed approximately cylindrical, and slightly less than the diameter of the bore that is being threaded. This will give far greater strength to a tap member or chaser, than where the same is constructed of a substantially thin flat bar whose thickness is equal to the sine of the angle subtended by the cutting or threaded portion of the chaser.

In U. S. Letters Patent No. 1,188,831, granted to me June 27, 1916, I have illustrated, described, and claimed a collapsible thread cutting device in which the tap threads or thread cutting members, which are in the nature of chasers, and are or may be substantially of the construction and arrangement herein set forth; but my present improvements are not comprised in the subject-matter of said prior application.

Having thus described my invention, I claim:

1. A collapsible tap formed in two sections in which each tapping portion has a long cutting face, and another short cutting face adjacent the point of the tool and extending to its extremity.

2. A collapsible tap having the threaded end thereof formed in two sections each provided with a plurality of cutting faces and arranged to constitute a tap when the sections are offset, the sine of the angle on outer circle of the threaded ends being less than radius of inner circle so that by a sliding movement of one part on the other in the plane of their contacting faces, the tap may be withdrawn without reversing its rotative movement.

3. A collapsible tap comprising a bar formed in two complemental sections contacting on a substantially axial plane and having at one end cutting threads arranged to constitute a tap when the sections are offset by relative movement transversely of the tap, the two members having connecting means at one portion, and having at another portion shifting means that are carried by the two members, and operable to open and close the sections by movement on said contacting faces.

4. A collapsible tap comprising a bar formed in two complemental sections contacting on a substantially axial plane and having at one end cutting threads arranged to constitute a tap when the sections are offset by movement transversely of the tap, the two members having connecting means at one portion, and having at another portion connecting means that are carried by the two members, and operable to open and close the sections by movement of the parts on said contacting faces, each tapping portion having a single long cutting land, and another short cutting face adjacent the point of the tool extending to its extremity.

5. A collapsible tap comprising a bar formed in two complemental sections contacting on a substantially axial plane and having at one end cutting threads arranged to constitute a tap when the sections are offset by relative movement transversely of the tap, the two sections being pivoted at their rear ends to swing on their contacting faces, one of the sections having a spindle rotatable in a transverse bore therein, the other spindle having a longitudinal extending slot, the spindle having a cylindrical extension that is eccentric and extending into said slot in the other section whereby the turning of the spindle will cause the sections to open and close.

6. A collapsible tap comprising a bar formed in two complemental sections contacting on a substantially axial plane and having at one end cutting threads arranged to constitute a tap when the sections are offset by relative movement transversely of the tap, the two sections being pivoted at their rear ends to swing on their contacting faces, one of the sections having a spindle rotatable in a transverse bore therein, the other spindle having a longitudinal extending slot, the spindle having a cylindrical extension that is eccentric and extending into said slot in the other section whereby the turning of the spindle will cause the sections to open and close, said spindle having a threaded extremity, and a locking nut on the extremity closing said slot.

7. A collapsible tap comprising two complemental tap members contacting on a substantially axial plane and having at one end thereof cutting threads, and a combined holding device and actuator engaging both of these tap members and connected for holding said members in face to face contact and to operate the same by shifting them one upon the other.

FRANCIS H. RICHARDS.

Witnesses:
JOHN MORRIS,
H. D. PENNEY.

Copies of this patent may be obtained for five cents each, by addressing the "Commissioner of Patents, Washington, D. C."